Figure 1:
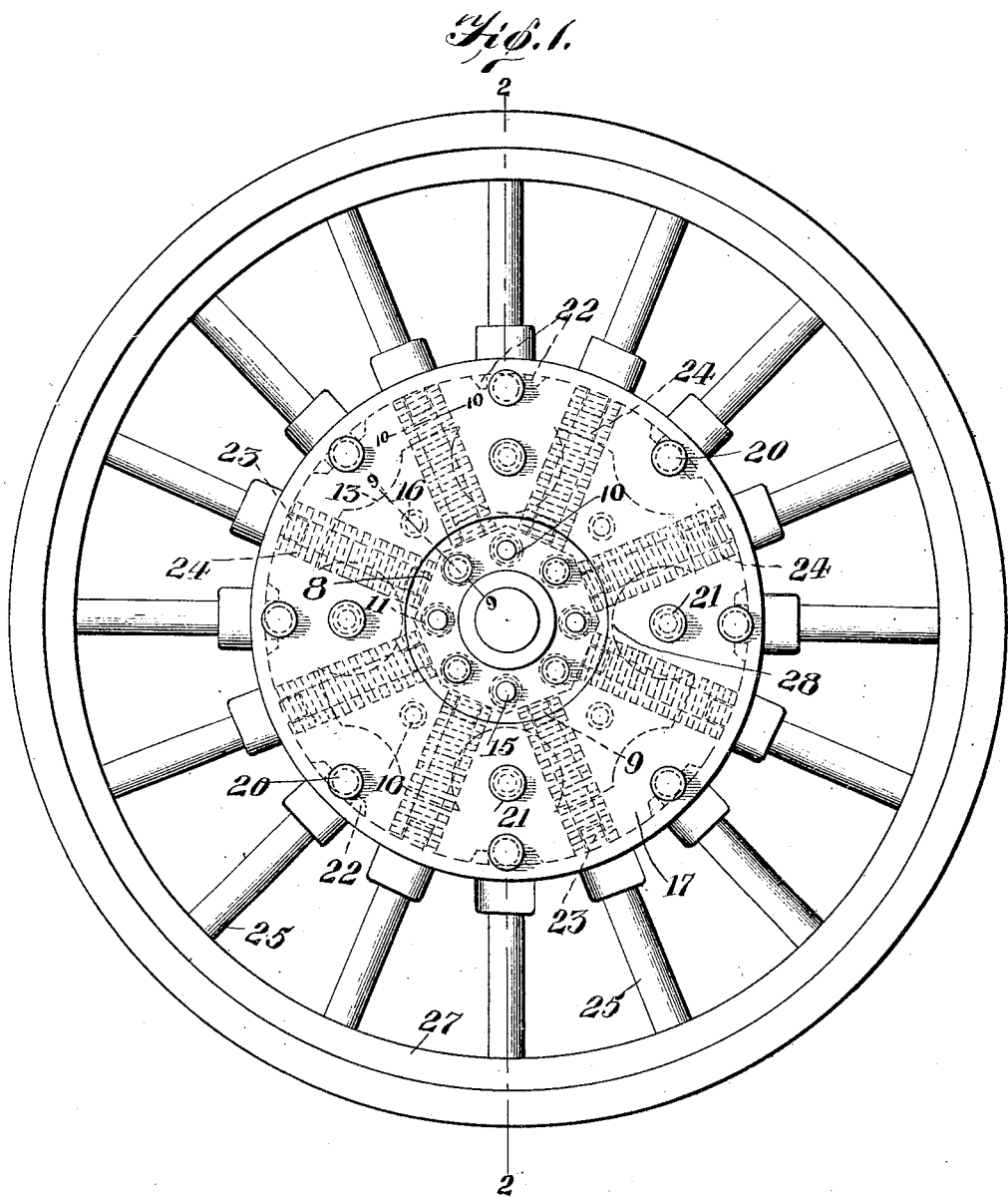

No. 856,156. PATENTED JUNE 4, 1907.
J. B. HUNTER.
VEHICLE WHEEL.
APPLICATION FILED MAR. 6, 1906.

3 SHEETS—SHEET 1.

WITNESSES:
D. E. Wilson
Jos. A. Ryan

INVENTOR
John Berkeley Hunter.
BY Munn & Co.
ATTORNEYS

No. 856,156. PATENTED JUNE 4, 1907.
J. B. HUNTER.
VEHICLE WHEEL.
APPLICATION FILED MAR. 6, 1906.
3 SHEETS—SHEET 2.
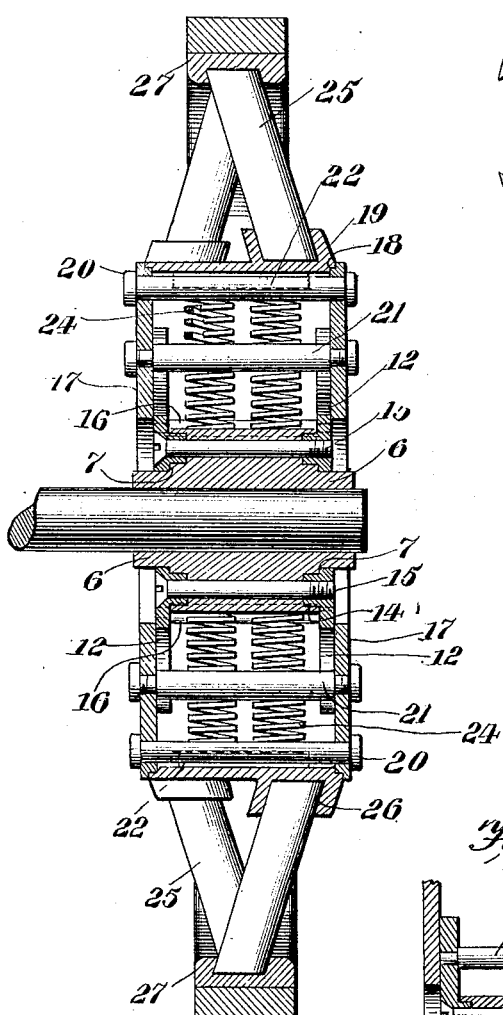
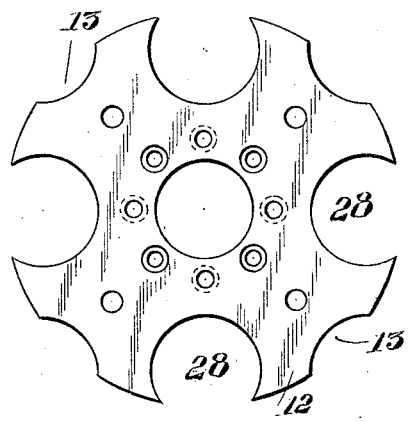
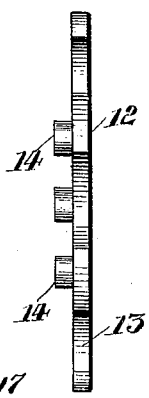
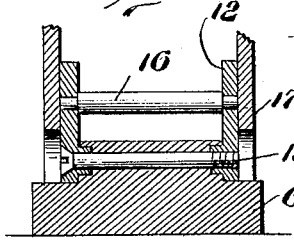
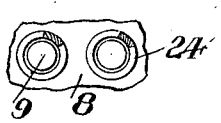
WITNESSES:
L. C. Wilson
Jos. A. Ryan
INVENTOR
John Berkeley Hunter.
BY Munn & Co.
ATTORNEYS No. 856,156. PATENTED JUNE 4, 1907.
J. B. HUNTER.
VEHICLE WHEEL.
APPLICATION FILED MAR. 6, 1906.
3 SHEETS—SHEET 3.
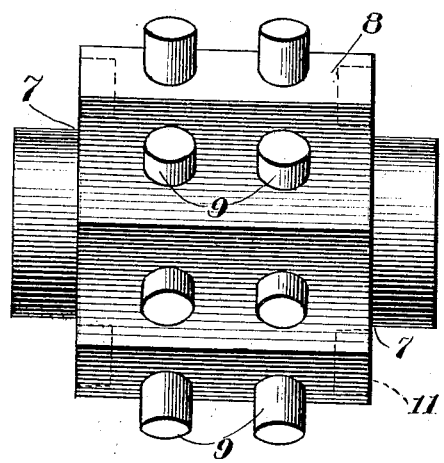
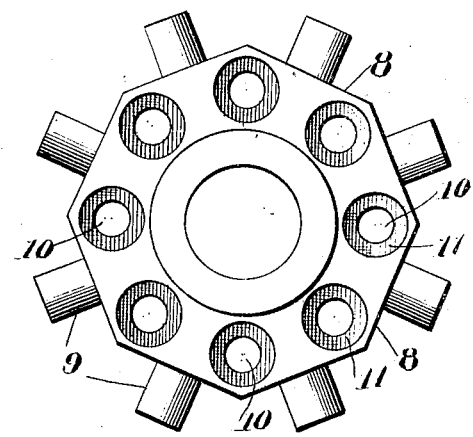
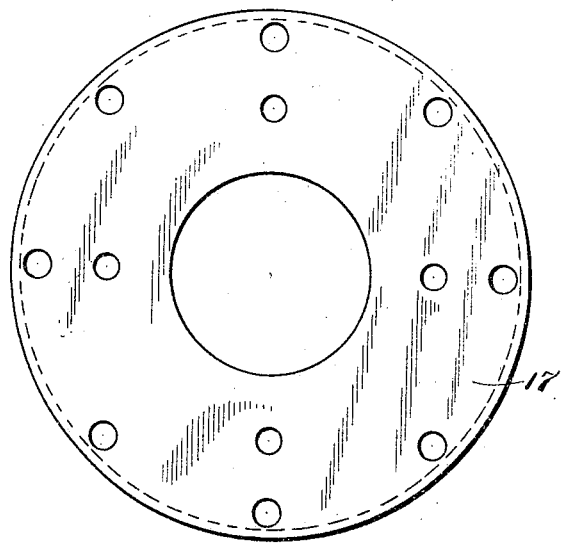
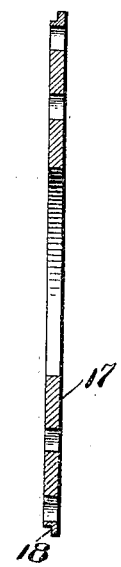
WITNESSES:
INVENTOR
John Berkeley Hunter
BY
ATTORNEYS

UNITED STATES PATENT OFFICE.

JOHN BERKELEY HUNTER, OF PITTSBURG, PENNSYLVANIA.

VEHICLE-WHEEL.

No. 856,156.   Specification of Letters Patent.   Patented June 4, 1907.

Application filed March 6, 1906. Serial No. 304,474.

*To all whom it may concern:*

Be it known that I, JOHN BERKELEY HUNTER, a citizen of the United States, and a resident of Pittsburg, in the county of Allegheny and State of Pennsylvania, have made certain new and useful Improvements in Vehicle-Wheels, of which the following is a specification.

This invention is a spring wheel particularly adapted for automobiles, although applicable for other vehicles and also for yieldable pulleys and gear wheels.

The object of the invention is to provide an improved construction of wheel in which the rim is cushioned with respect to the hub, special features being an octagonal metal hub, an outer rim, an inner ring, spokes between the rim and ring, and radial spiral springs between the hub and ring allowing free vibration in all directions radial to the hub, four annular metal plates being fitted between the hub and the ring and lapped and bolted together so as to brace the wheel in all directions.

The invention is illustrated in the accompanying drawings, in which

Figure 1 is a side elevation of the wheel. Fig. 2 is a central cross section thereof. Figs. 3 and 4 are respectively side and edge views of one of the side plates secured to the hub. Figs. 5 and 6 are respectively side and end views of the hub. Fig. 7 is a detail side view, and Fig. 8 is a cross sectional view of one of the annular side plates. Fig. 9 is a detail cross section on about line 9—9 of Fig. 1, drawn through one of the spacing bolts 16, and Fig. 10 is a detail section on about line 10—10 of Fig. 1 illustrating the square cross sectional shape of the springs.

Referring specifically to the drawings, the hub is indicated at 6 turned down or reduced at the ends to produce shoulders 7. The outer surface of the hub between the shoulders is octagonal, as indicated at 8, and each of the faces has a pair of radially projecting lugs 9 arranged side by side in line parallel with the axis of the hub, forming two parallel rows around the hub. The hub has a series of bores 10 from one shoulder 7 to the other, and these bores are counterbored at the ends as at 11.

At 12 are indicated one pair of annular side plates each of which fits over one end of the hub, against the shoulder 7. These side plates are recessed in their outer edges, as at 13, to give room for the radial or perpendicular play of the bolts 20 connecting the other pair of plates 17 to be hereinafter described. The side plates 12 are also recessed in their outer edges at 28 alternating with the recesses 13. The purpose of these recesses 28 is to permit the passage of the bolts 21 which extend between the side plates 17 and operating within the recesses 28 serve by abutment with the side walls of said recesses to limit the torsional movement of the wheel in stopping and starting. In this operation it will be noticed the springs 24 will be engaged by the cross bolts 21 before they contact with the walls of the recesses 28 so that the stopping of the torsional movement of the wheel by the abutment of the cross bolts with the walls of the recesses 28 will be cushioned by the said springs, as will be better understood from Fig. 1 of the drawing. The plates 12 have bosses 14 which fit within the counterbores 11 and are properly bored, tapped, and countersunk, to receive the bolts 15 which extend through the bores 10 and serve to fasten said plates rigidly to the hub. The heads of the bolts are sunk, so that no parts thereof project beyond the outer faces of the said plates, and there is consequently no interference with the radial vibration or movement of the outer parts of the wheel. The outer parts of the plates 12 are further supported and strengthened by four spacing bolts 16 which extend across the alternate clear spaces between the springs.

The other pair of annular side plates are indicated at 17, located upon or against the outer surfaces of the plates 12, on each side of the wheel, and these plates have interior rabbets 18 at their outer edges which receive the fitted edges of a ring 19 on which the spokes are supported. The plates 17 are clamped in position by eight bolts 20 arranged in the spaces between the springs and which cross directly within and serve to support the ring 19, and are spaced apart by four spacing bolts 21 located in a smaller circle and crossing in the alternate clear spaces between the springs and alternating with bolts 16 which space the plates 12. The ring 19 has eight pairs of inwardly projecting ribs 22 between which the bolts 20 are located, so that the ring cannot turn between the plates, under tangential strain. It also has eight pairs of lugs 23, corresponding in radial position to the lugs 9 on the hub, and the same number of pairs of spiral springs 24 are set in place between the ring and the hub, the lugs entering opposite ends of the coils and serving to hold the springs in position.

The staggered or double dished spokes 25 are set in sockets 26 on the outer surface of the ring 19, and in corresponding sockets in the rim 27, which may be provided with any kind of tire desired. The spokes are conveniently sixteen in number, arranged alternately in line with the springs and with the bolts 20.

The construction shown and described gives a wheel of great strength in proportion to weight. The movement incident to the compression and expansion of the springs takes place between the side plates 12 and 17 and shock and vibration are absorbed or diminished.

I claim:

1. A spring wheel having in combination a hub, annular side plates fixed to the ends of the hub and having recesses in their outer edges, outer annular side plates, the inner edges of which lap the said plates and which are connected by bolts extending across through said recesses, a ring supported upon the outer edges of said outer side plates, a rim at the periphery of the wheel, spokes between the rim and the ring, and springs between the ring and the hub.

2. A spring wheel having an inner structure comprising a hub and outwardly extending plates at each side, in combination with an outer structure having a ring with inwardly projecting plates at each side which lap the said plates, and radial springs between the ring and hub, the ring having cross ribs on its inner face, and the said inwardly projecting plates being clamped to the ring by cross bolts which extend between the ribs.

3. A spring wheel having an inner structure comprising a hub and outwardly extending recessed plates at each side secured to the ends of the hub, the plates being spaced apart by spacing bolts, and an outer structure spring-supported on the hub and having inwardly extending side plates which lap said plates on the outer faces thereof, said inwardly extending plates being connected and spaced by cross bolts which extend through said recesses.

4. A spring wheel comprising a hub, annular side plates fixed to the hub, and having recesses in their outer edges, annular side plates having a turning movement independent of the hub, a ring carried by said independently turning plates, springs supporting the ring and cross bolts between said independently turning side plates and operating in the recesses of the side plates fixed to the hub.

5. A spring wheel having a hub, side plates held to the hub and recessed in their outer edges, cross bolts operating in said recesses, side plates connected with said cross bolts, a ring carried by the side plates, and springs supporting the ring and arranged to cushion the cross bolts with the side walls of the recesses in the hub plates, substantially as set forth.

6. A spring wheel having a hub provided in its ends with sockets and with bolt holes leading transversely therefrom through the hub, the side plates having inwardly projecting bosses fitting in said sockets of the hub and having bolt holes, bolts passing through said holes and openings in the hub and securing the side plates in place, a ring, plates projecting inwardly from the ring and lapping along the side plates of the hub, and springs bearing between the hub and ring, substantially as set forth.

7. The combination in a spring wheel with parts comprising one a hub and the other a ring surrounding the same, of the side plates projecting in pairs from said parts and lapping alongside each other, bolts extending between the opposite plates of one pair and engaging with the plates of the other pair to limit the torsional movement of the ring, and springs between the hub and ring, substantially as set forth.

JOHN BERKELEY HUNTER.

Witnesses:
SOLON C. KEMON,
PERRY B. TURPIN